United States Patent [19]

Goldwasser

[11] Patent Number: 5,096,423

[45] Date of Patent: Mar. 17, 1992

[54] COMPUTER SYSTEM FOR TEACHING ABBREVIATIONS FOR TEXT AND DATA PROCESSING FUNCTIONS

[76] Inventor: Eric P. Goldwasser, 993 Barberry Rd., Yorktown Heights, N.Y. 10598

[21] Appl. No.: 139,292

[22] Filed: Dec. 29, 1987

Related U.S. Application Data

[63] Continuation-in-part of Ser. No. 807,750, Dec. 11, 1985, abandoned, which is a continuation-in-part of Ser. No. 722,258, Sep. 3, 1985, abandoned.

[51] Int. Cl.[5] .............................................. G09B 19/00
[52] U.S. Cl. .................................................... 434/118
[58] Field of Search .......................... 364/419; 400/63; 434/118

[56] References Cited

U.S. PATENT DOCUMENTS 4,438,505 3/1984 Yanagiuchi et al. ................. 364/419

OTHER PUBLICATIONS

Leyland G. Alkire, Jr., *Periodical Title Abbreviations by Title*, vol. 2, 1977.
Leyland G. Alkire, Jr., *Periodical Title Abbreviations by Abbreviations* vol. 1, 1977.

*Primary Examiner*—Edward M. Coven
*Assistant Examiner*—Jessica J. Harrison

[57] ABSTRACT

A teaching method is disclosed for computer systems that permit longer sequences of user actions such as keypresses or selection via pointing to be replaced by shorter sequences of user actions (abbreviations), which method shows the user the abbreviation by either highlighting the characters or sounding beeps or pronouncing the characters of the abbreviation whenever the user neglects to use the abbreviation. The method thus teaches the user the abbreviations while he/she is doing normal work.

28 Claims, 11 Drawing Sheets

```
    Now is the time for all good men to
come to the  aid of their country.

a      each   if    on    so     up    now
all           in    of    some         time
and    for   is    one          very  good
are    from  it    or    that         men
as                 out   the    was   come
at     go    just        their  we    aid
                   put   them   were  country be     had   know       then   what
but    have        quiet there  when
by     he    like       these  will
       her         right they   with
can    his   make       this   word
       how   my   said  to
do                see   too    you
did    I          not   she    two    your QWERTYUIOP     1 2 3 4 5 6 7 8 9 0
A S D F G H J K L end Cap Par s ed ing
! Z X C V B N M , . ? ' " -- edit erase
```

FIG. 7

```
w_
walk    what    will
want    when    wind
warm    where   window
was     which   winter
wash    while   wish
watch   white   with
way     who     without
        whole
we      whom    [woman]
weak    why     wood
week            word
well            work
went            world
were            would
                write Q W E R T Y U I O P  s  ed  er  ly  ing  tion
     A S D F G H J K L  Space  Cap-F8  Par
        Z X C V B N M , . ?  Edit-F10 Undot
```

COMPUTER SYSTEM FOR TEACHING ABBREVIATIONS FOR TEXT AND DATA PROCESSING FUNCTIONS

CROSS-REFERENCE TO RELATED APPLICATIONS

This application is a continuation-in-part of the U.S. patent application Ser. No. 807,750, now abandoned, filed Dec. 11, 1985, of Eric P. Goldwasser entitled "Computer Text Entry System Using Fast Text Entry and Fast Text Entry Teaching Aids", which was a continuation-in-part of application Ser. No. 06/722,258, now abandoned, filed Sept. 3, 1985.

This application is also related to the following U.S. patent applications:

U.S. patent application Ser. No. 854,430, now U.S. Pat. No. Re. 37773, filed Apr. 21, 1986 of Eric P. Goldwasser and Dorothy M. Goldwasser entitled "Method of Creating Text Using a Computer"; and U.S. patent application Ser. No. 748,618, now U.S. Pat. No. 4,891,756 filed June 25, 1985 of Eric P. Goldwasser entitled "Stroke Typing System".

The disclosure of the aforementioned U.S. patent application Ser. No. 854,430 (now allowed) is incorporated herein by reference.

FIELD OF THE INVENTION

This invention relates generally to computer data processing systems in which whole words or phrases or command sequences are entered via an abbreviation consisting of (1) one or more sequential or simultaneous keypresses, and/or (2) the selection of the text or commands from a menu display. The invention is used to teach the computer user the abbreviations and/or the menu displays while the computer user is using the computer system in the normal manner.

DESCRIPTION OF THE PRIOR ART

There exist computer programs called "keyboard enhancers" which permit a user to define "macros", which are short sequences of keypresses to which other longer sequences of keypresses are associated. By entering the shorter sequence, referred to hereinafter as an "abbreviation", the longer sequence can be entered into the computer memory.

There also exist programs with predefined macros which the user need not define, but can use. An example of such a program with predefined macros is the BASIC program that is built into the ROM (Read Only Memory) of the IBM Personal Computer. To type the word, "Print" the user can press the "Alt" key and then press the "P" key before releasing the "Alt".

Some of these programs, in particular the IBM BASIC program, also display what are called "soft keys", which show the user the meaning of various function keys by displaying, usually at the bottom of the screen, the sequence of keys that can be replaced by the function key.

However, these programs do not alert the user that there is an abbreviated way of entering a sequence of keypresses or commands, whenever the sequence is entered.

The aforementioned U.S. patent application Ser. No. 654,430, discloses a system of creating text using a computer having a display screen and a "pointing mechanism" (e.g., a touch sensitive display, a light pen, a keypad or a mouse-responsive cursor) for identifying locations on this display screen. This so-called Pointwriter (TM) system involves displaying, in menu form, successive lists of words or phrases on the screen so that the user may select the words or phrases to be used in the text by simply "pointing" to them. The computer responds to the pointing mechanism and displays on the screen a line of text comprising the selected words or phrases in their successive order of selection.

This Pointwriter system requires the user to find the word or phrase he/she wishes to type from one of a number of successively displayed menus. The speed of data entry therefore depends, in part, upon the ability of the user to recall (1) if a word or phrase to be entered in the text is displayed in a menu at all; if so, (2) the particular menu which includes this word or phrase; and (3) the position of this word or phrase within the menu.

Finally, the aforementioned U.S. patent application Ser. No. 748,618, discloses a so-called "Stroke Typing" (TM) system for creating text formed, in part, of predefined linguistic expressions by executing both sequential and simultaneous keyboard keypresses. This system controls a computer to receive keypresses from the operator and to translate (or, alternatively, not to translate) groups of keypresses into linguistic expressions according to (1) the timing of the keypresses, (2) the presence or absense of a delimiter character at the beginning or end of a group of keypresses, (3) the presence or absence of the group of keypresses in a dictionary of stored groups of keypresses (abbreviations), and/or (4) the sequence of keypresses that preceded or followed the group.

In all the cases described above it would be desirable to teach the user the abbreviations for longer sequences of keypresses and selections, whenever the user neglects to use the abbreviations.

SUMMARY OF THE INVENTION

One object of the present invention is to provide a method of teaching the user the abbreviations for words, phrases, and command sequences, which method will remind the user of the existence of an abbreviation whenever the user neglects to use it.

A more general object of the present invention is to provide a method for teaching a computer system user shorter sequences of user actions (abbreviations) for causing the computer to perform data manipulations of all types, including text and data processing functions, corresponding to longer sequences of user actions.

A further more specific object of the invention is to provide a method of teaching a Stroke Typing system user the abbreviations, sequences of sequential and/or simultaneous keypresses (strokes), that can be used in place of ordinary letter by letter typing to enter text consisting of linguistic expressions into the computer.

A further more specific object of the invention is to provide a method of teaching a Pointwriter or Stroke Typing system user both the number of letters of a word or phrase that must be typed before the word or phrase will be displayed in a menu, and the position of the word or phrase in the menu, so that the user can add this word or phrase to the text by typing this number of letters and then selecting the word or phrase from the menu.

These objects, as well as other objects which will become apparent from the discussion that follows, are achieved, according to the present invention, by bringing the user's attention to the character or characters of the abbreviation of the desired word or phrase (linguistic expression) or command sequence, the character or characters designating the menu containing the linguistic expression or command, and/or the position of the linguistic expression or command within the menu, whenever this desired linguistic expression or command sequence is entered in the conventional manner i.e. without using the abbreviation. The user can be shown the character or characters of the abbreviation, or the procedure for selecting the linguistic expression or command sequence from a menu, in one or more of the following ways: (1) the characters of the longer sequence of text words which are part of the corresponding abbreviation or designate the appropriate menu can be highlighted and, if characters are required which are not part of the longer sequence, these characters can be temporarily displayed in the text; (2) a screen image of the keyboard can be displayed and the keys which correspond to the characters of the abbreviation, or the characters which designate the menu, can be blinked; (3) a number of beeps of one or more frequencies can sound to indicate the position of characters in the longer sequence which are in the abbreviation or which designate the appropriate menu; and (4) a synthesized voice can pronounce the characters of the abbreviation or which designate the menu display.

As mentioned above, the Pointwriter system disclosed in the U.S. patent application Ser. No. 854,430 allows the user to create text by choosing one of a large number of linguistic expressions which are contained in several menus for display on the screen. This system attempts to guess the linguistic expressions that the user wants and then displays as many of the most likely linguistic expressions as will conveniently fit on the display screen so that the user can choose one of the displayed linguistic expressions rather than type it out.

The present invention calls the user's attention to both the letters of the linguistic expression that must be typed in order for the word to be displayed and the position of the word on the display screen. This is done whenever the user types the word in the normal manner or in a less efficient manner than could have been used.

Hence, for example, whenever the user types a word and a following space, for a short period of time the menu on which the word appears can be displayed with all the characters of the word itself highlighted in some manner and with the characters that must be typed before the word will be displayed highlighted in each and every word on that menu. The highlighting can be accomplished by displaying the characters with greater brightness, and/or by blinking them, and/or by displaying a box around them. The number of characters to type can be indicated by highlighting them, and/or by beeps and/or by pronouncing the characters.

For a full understanding of the present invention, reference should now be made to the following detailed description of the preferred embodiments of the invention and to the accompanying drawings.

DESCRIPTION OF THE PREFERRED EMBODIMENTS

FIGS. 1-5 illustrate one preferred embodiment of an image displayed on the display screen of a computer in accordance with the present invention. This embodiment may be used with, but is not limited to, a system of the type disclosed in my aforementioned U.S. patent application Ser. No. 748,618.

In this embodiment, the text is entered and scrolled upward in an area indicated by the dashed outline 150. It will be understood that the dashed lines representing this outline 150 are not displayed on the screen. Within the area 150 are displayed one or more lines of text as this text is entered by the system user.

Figure 1:
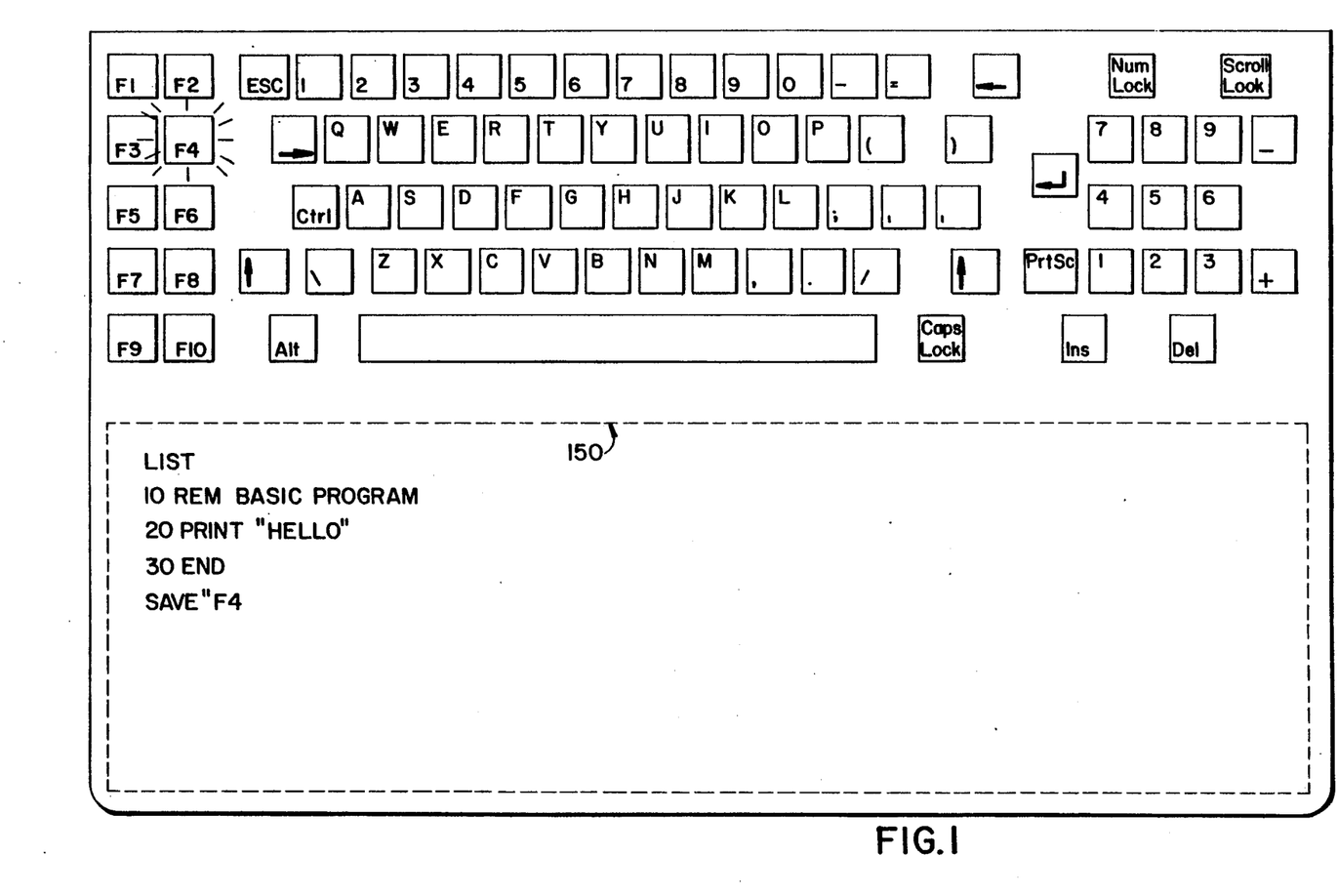
FIGS. 1 and 2 are both elevational views of a display screen for the IBM BASIC program.

FIG. 1 illustrates what can happen if the sequence of keypresses "s ", "a ", "v ", "e ", and """" are entered by the user. This sequence has an abbreviation consisting of the single keypress "F4". Hence, after the sequence "save'"" is entered, the "F4" key is highlighted, and the characters "F" and "4" are displayed in the text after the sequence. In addition or alternatively, four beep tones can be played through the speaker or the words "F" and "4" can be pronounced.

Figure 2:
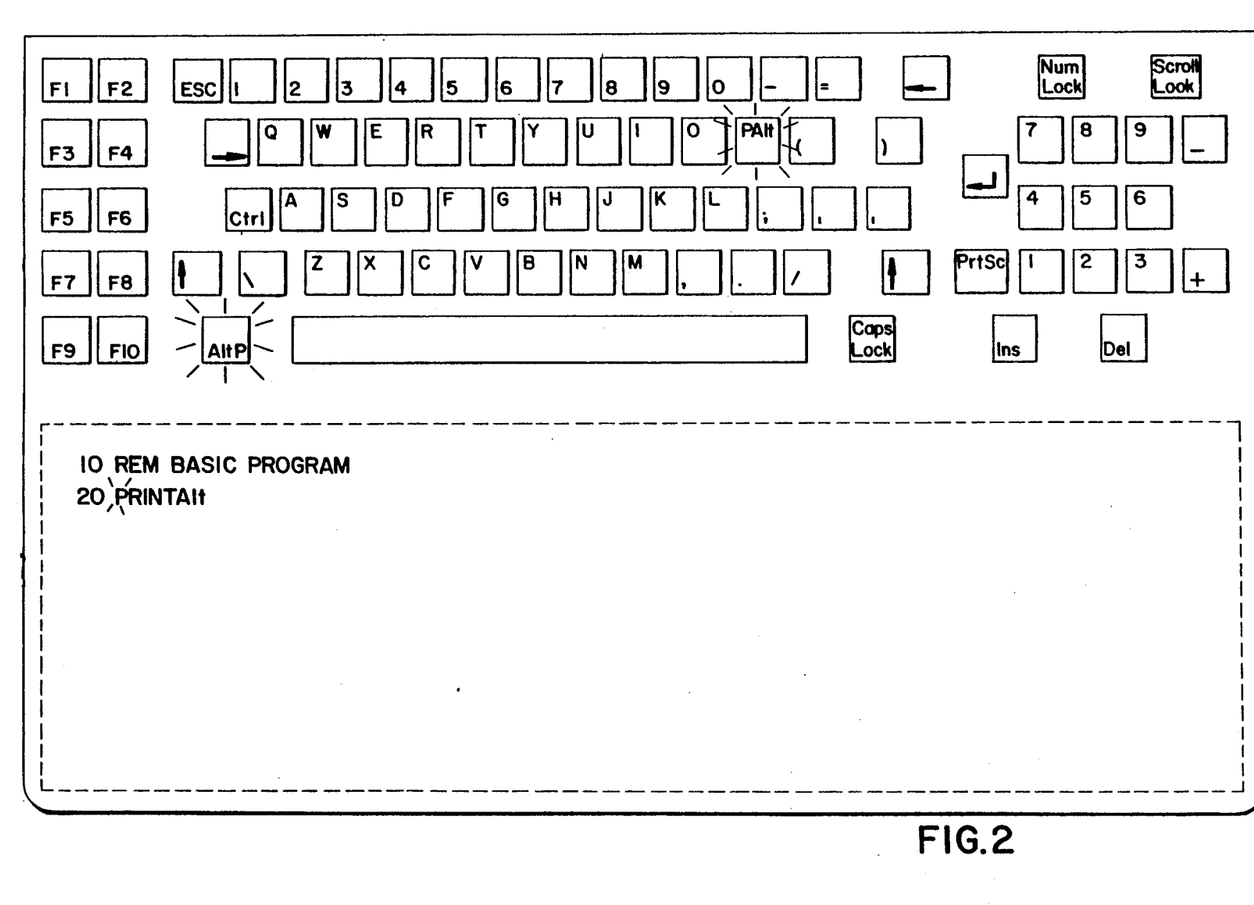

FIG. 2 illustrates what can happen if the word "print" is entered. This sequence has the abbreviation consisting of a two keypress sequence "Alt" "P", but the "Alt" key must be held down until the "P" key is pressed. Hence, after the word "print" is entered, the "Alt" and "P" keys are highlighted, the character "P" is displayed on the "Alt" key, blinking, the character "P" is displayed on the "P" key also blinking, and the characters "A", "1", and "t" are displayed on the "P" key. The characters "A", "1", and "t" are not blinking on either the "Alt" key or the "P" key to show that the "Alt" key should stay down until the "P" key is pressed. Also the character "p" of the text word "print" is blinking and the characters "A", "1", and "t" are displayed in the text after the word "PRINT". In addition or alternatively, the words "alt" and "pea" can be pronounced.

Figure 3:
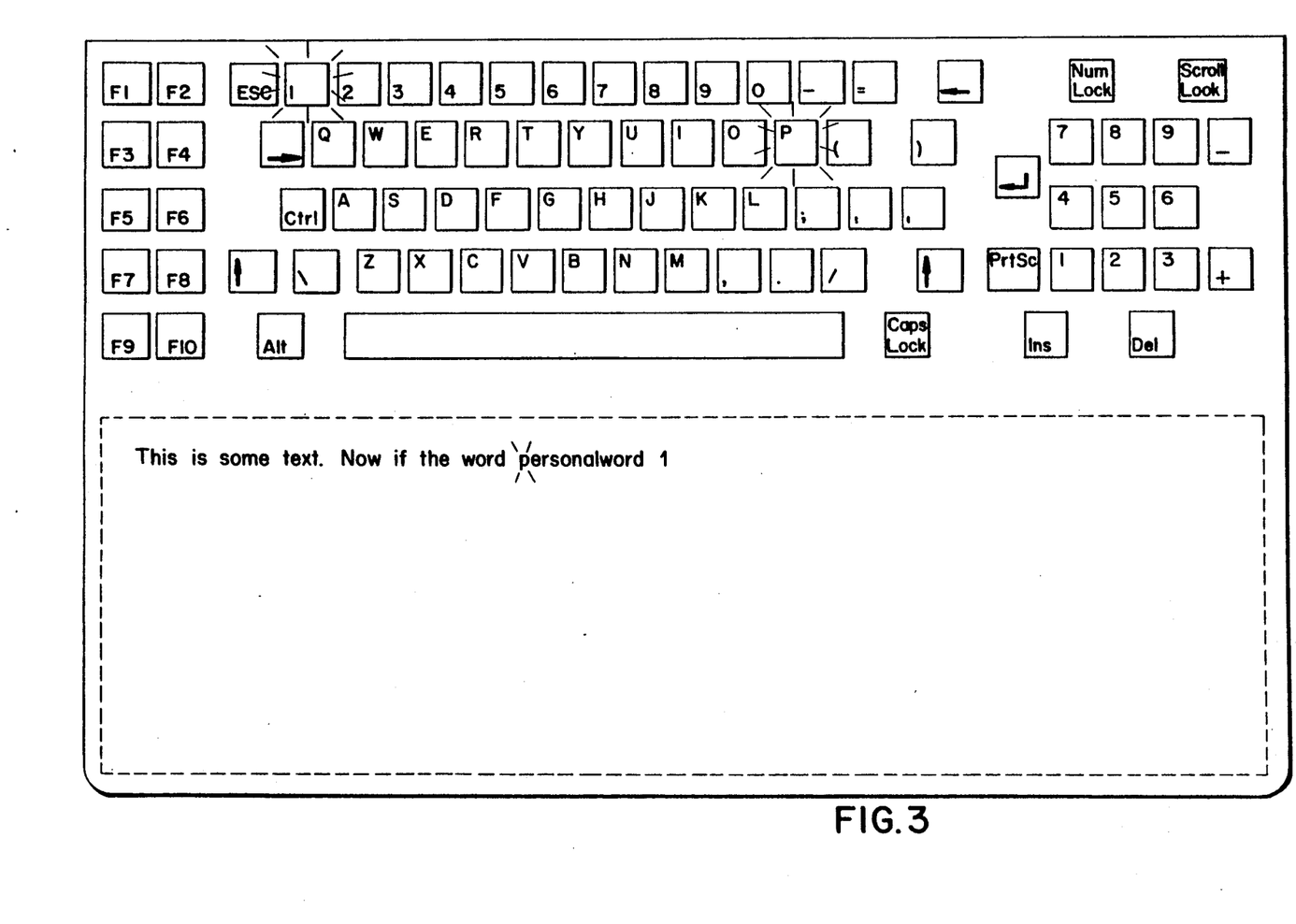
FIGS. 3-5 are all elevational views of a display screen for a Stroke Typing system of the type disclosed in the aforementioned patent application Ser. No. 748,618, which display screens demonstrate various teaching aids of the present invention.

FIG. 3 illustrates what can happen if a personal word such as "personalword", which has the abbreviation consisting of the characters "p" and "1" is entered by the user. The "P" and "1" keys are highlighted, the "p" in the text word is highlighted and the character "1" is displayed after the text word. In addition or alternatively, one beep tone can be played through the speaker or the words "pea" and "one" can be pronounced.

Figure 4:
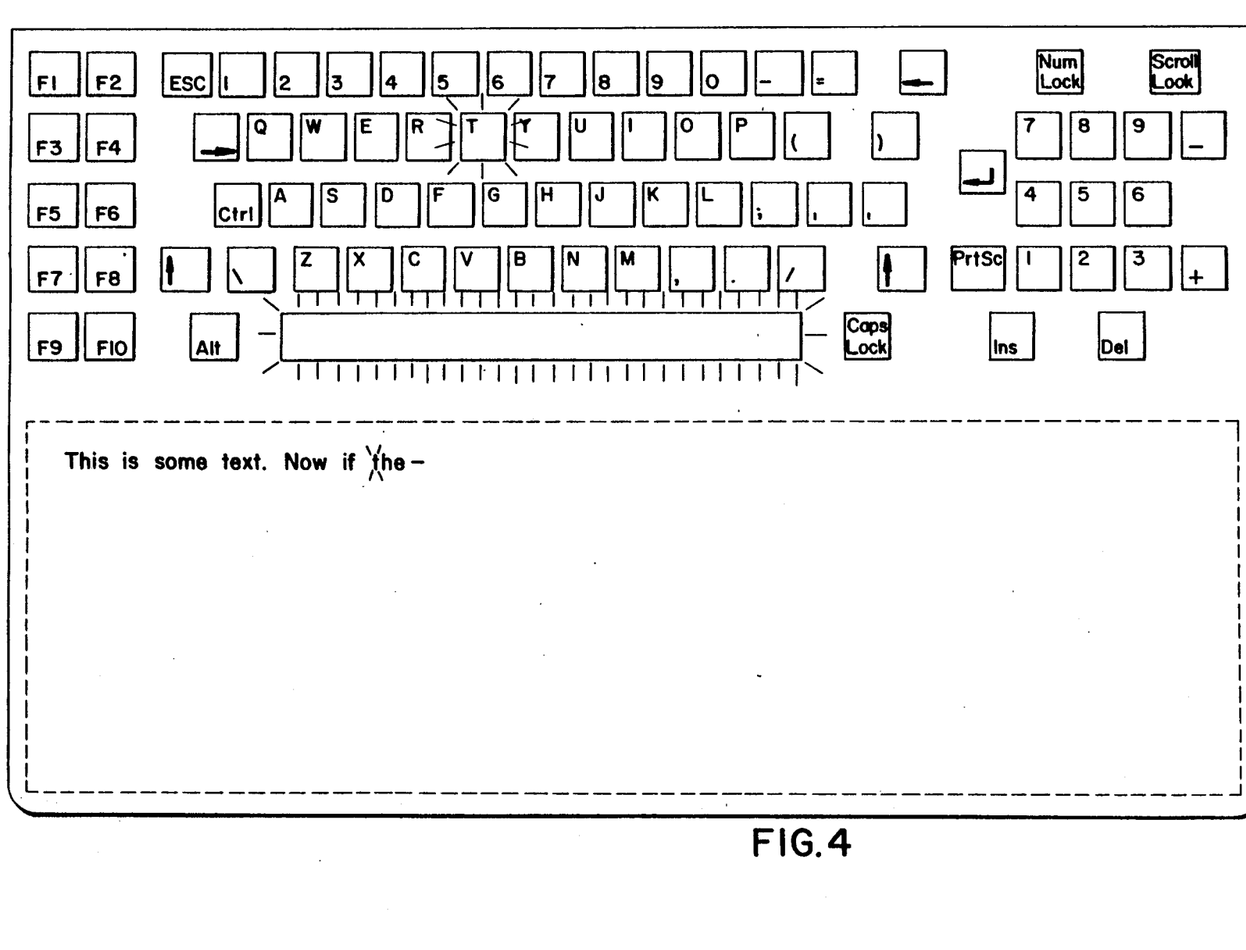

FIG. 4 illustrates what can happen if the word "the", which has the abbreviation consisting of the characters "t" and "space", is typed. After the space following the word "the" is entered, the "T" key and the space keys are highlighted. In addition or alternatively, one beep tone can be played through the speaker or the words "tee" and "space" can be pronounced.

Figure 5:
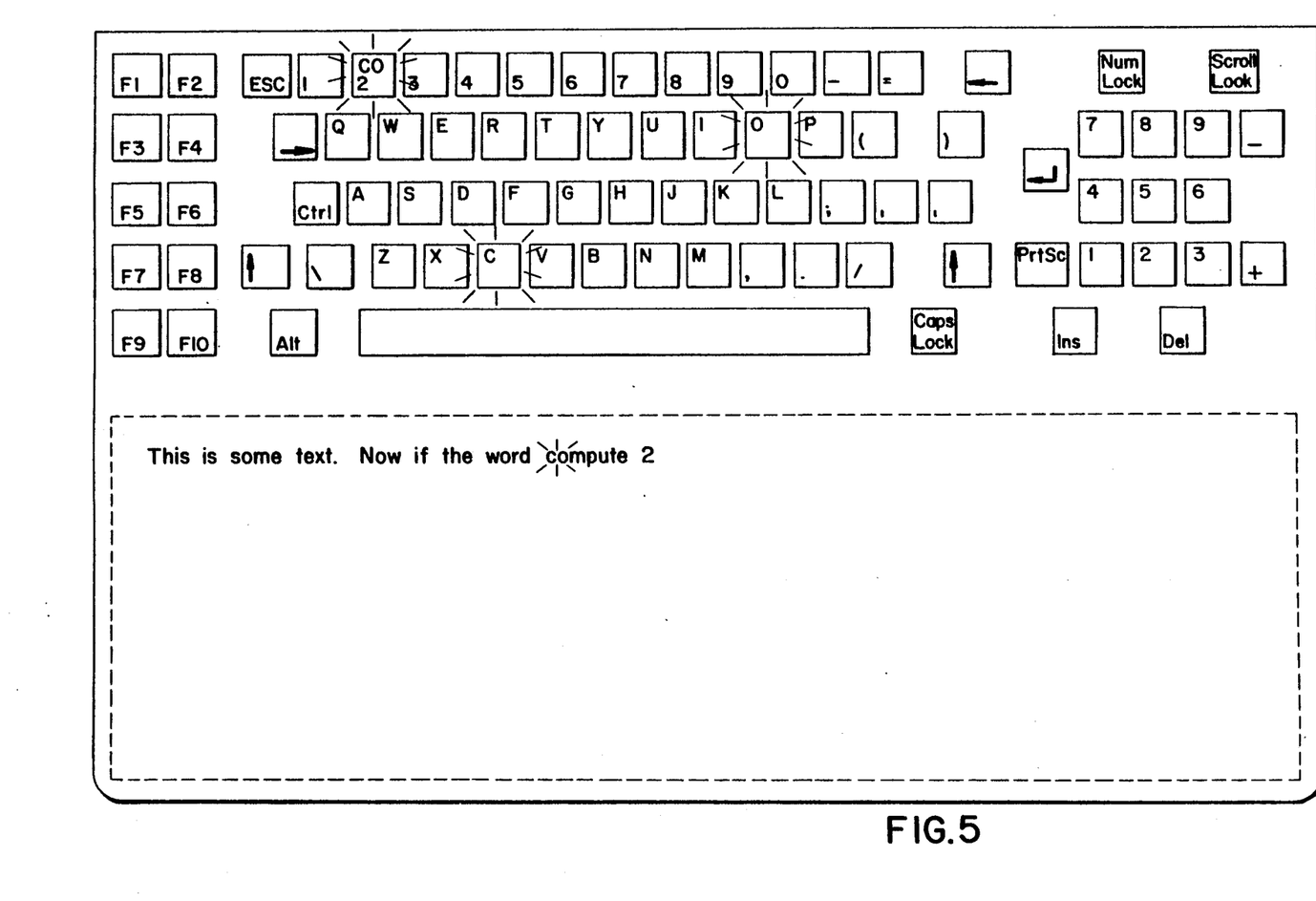

FIG. 5 illustrates what can happen if the word "compute", which has the abbreviation sequence "c", "o", "2", is typed. The "C", the "0", and the "2" keys are highlighted and/or blinked in quick succession to indicate the required sequence. In addition, the characters "c" and "o" are displayed on the "2" key and highlighted in the text word, and the character "2" is displayed in the text after the word "compute". In addition or alternatively, two beep tones can be played through the speaker or the words "see", "oh", "two" can be pronounced.

Figure 6A:
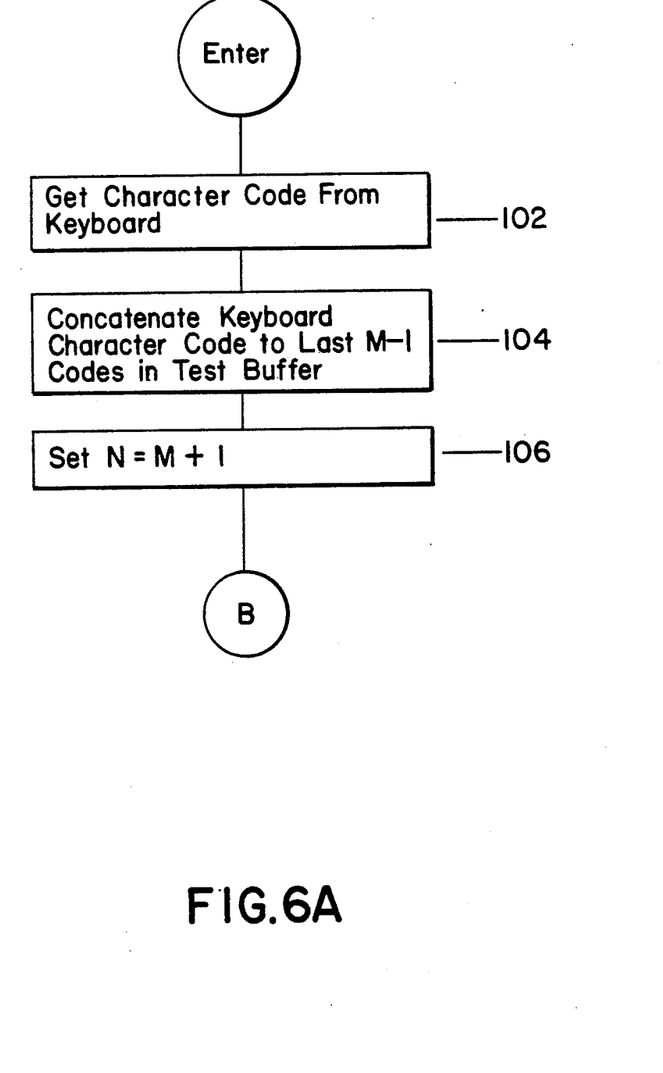
FIGS. 6A and 6B, taken together, are a flowchart of an algorithm for carrying out the teaching aids of FIGS. 1-5.
Figure 6B:
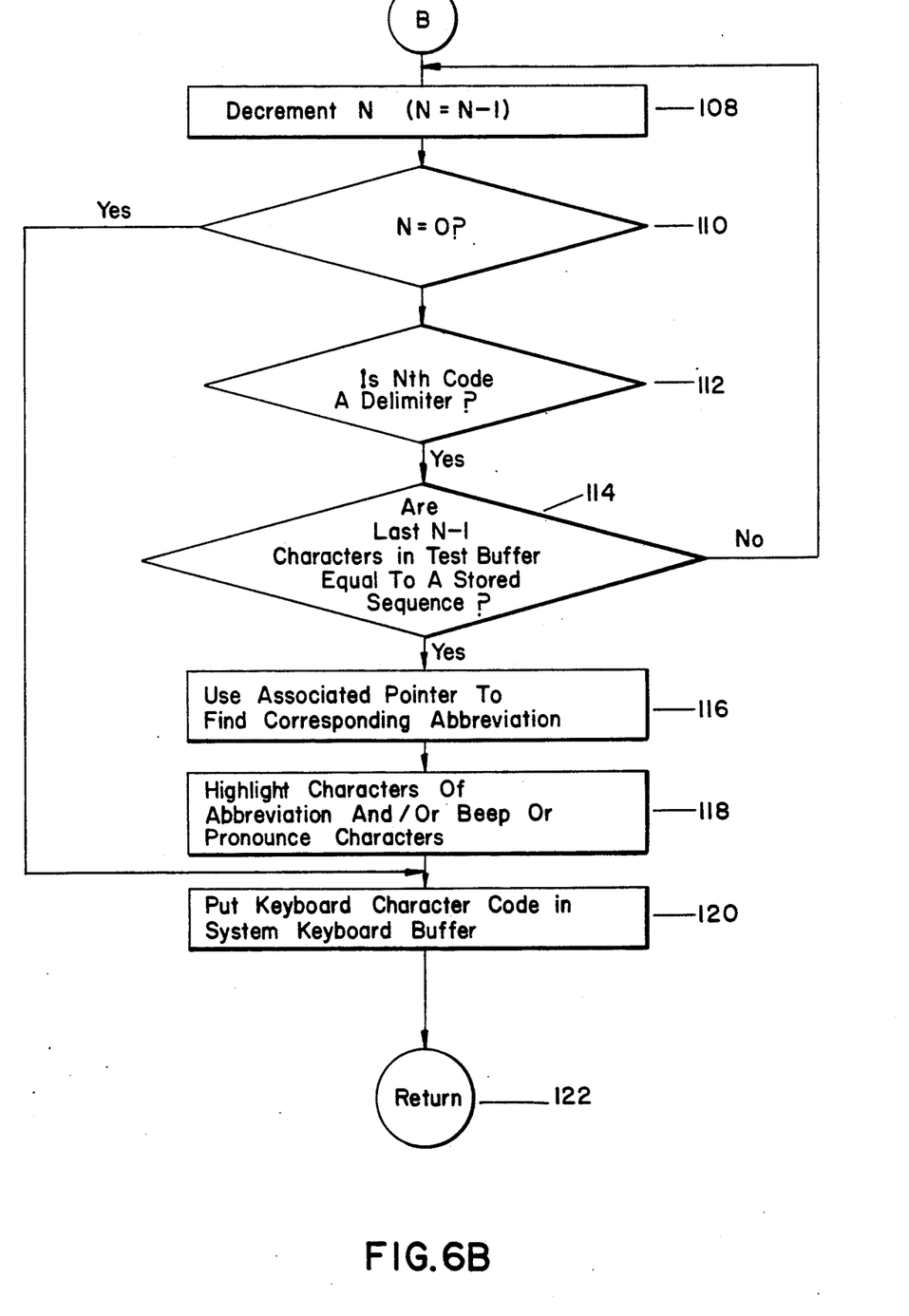

The above responses to typed sequences of keypresses is effected by a suitable program stored in the computer. The computer may comprise any well-known system, such as an IBM Personal Computer having a central processing unit, a memory, a keyboard and an alphanumeric character display. FIGS. 6A and 6B, taken together, are a flowchart for a program algorithm which carries out the basic steps of applicant's invention. Essentially, this program determines whether a sequence of keypresses entered into the computer has an abbreviation; if it does, it determines the abbreviation for this sequence of keypresses and brings the user's attention to the keypresses which comprise the abbreviation.

The algorithm assumes that there are stored, in the computer memory, both the sequences of keypresses which have abbreviations associated therewith, as well as the associated abbreviations themselves. A pointer is stored in the memory, along with each stored sequence of keypresses, which points to the address of the stored abbreviation associated with that sequence.

The program also assumes that there are stored, in the computer memory, (1) a parameter "M" representing the maximum number of characters in any sequence for which there is an abbreviation, and (2) the binary (e.g., ASCII) codes for so-called "delimiter" characters which can be used to delimit commands, words or names in a sequence of keypresses.

The parameter "M" is preferably modifiable by the user of the program so that the user may indicate the maximum number of characters that the computer should review as a single "sequence" to determine whether this sequence has an associated abbreviation. The upper bound of this parameter is limited only by the ability of the computer to carry out the algorithm in a reasonable time. As an example, the user may set $M=50$ characters (maximum) in a sequence.

As will be pointed out below, the algorithm will make its determination with respect to those sequences comprised of entire commands, words or names which have been separated by delimiters. Examples of such delimiter characters are a space, a quotation mark and a slash.

The algorithm shown in the flowchart of FIGS. 6A and 6B is entered each time the computer is interrupted by a keypress. Initially, the binary code for the keypress character (which may be an ASCII code, for example) is received by the computer and stored in a keyboard buffer (block 102). Before continuing to process this character (e.g., by means of a word processor program), the code is concatenated to the sequence of characters in a test buffer (block 104). The test buffer operates as an M character shift register allowing each new character to be shifted in and causing all the characters previously stored therein to shift so that the character which has been in the test buffer the longest will be shifted out.

A parameter N is then set equal to $M+1$ (block 106) and, thereafter, the parameter N is decremented ($N=N-1$) (block 108). If $N=0$, the remaining sequence of characters to be tested consists of only one character (block 110). In this case, the binary code for this character is placed in the system keyboard buffer for use and display by the computer (block 120).

If N is not 0, the program determines whether the Nth—i.e., the instant—character code represents a delimiter character—e.g., a space, quotation mark or slash. If so, the last $N-1$ characters are compared to determine whether they are equal to any one of the stored sequences, for which there are abbreviations (block 114). If not, the algorithm returns to block 108 and N is decremented again. If the N characters in the test buffer are equal to a stored sequence, the pointer associated with this stored sequence is used to find the corresponding abbreviation (block 116). The characters of this abbreviation are then retrieved from memory and the user's attention is called to these characters in the manner described above (block 118).

Figure 7:
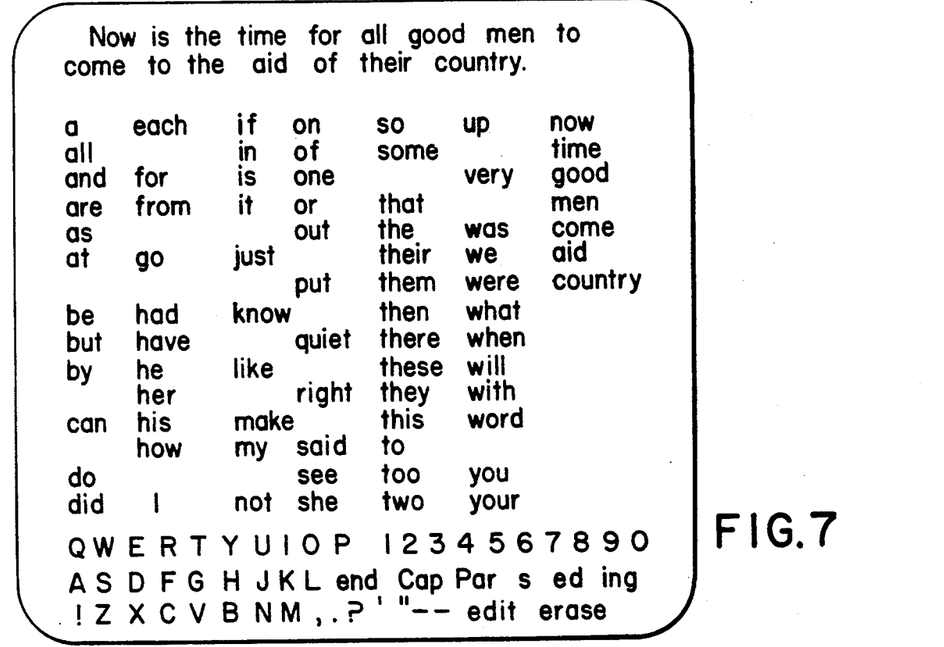
FIGS. 7 and 8 are both elevational views of a display screen for a Pointwriter system of the type disclosed in the aforementioned U.S. patent application Ser. No. 854,430, which display screens demonstrate various teaching aids of the present invention.
Figure 8:
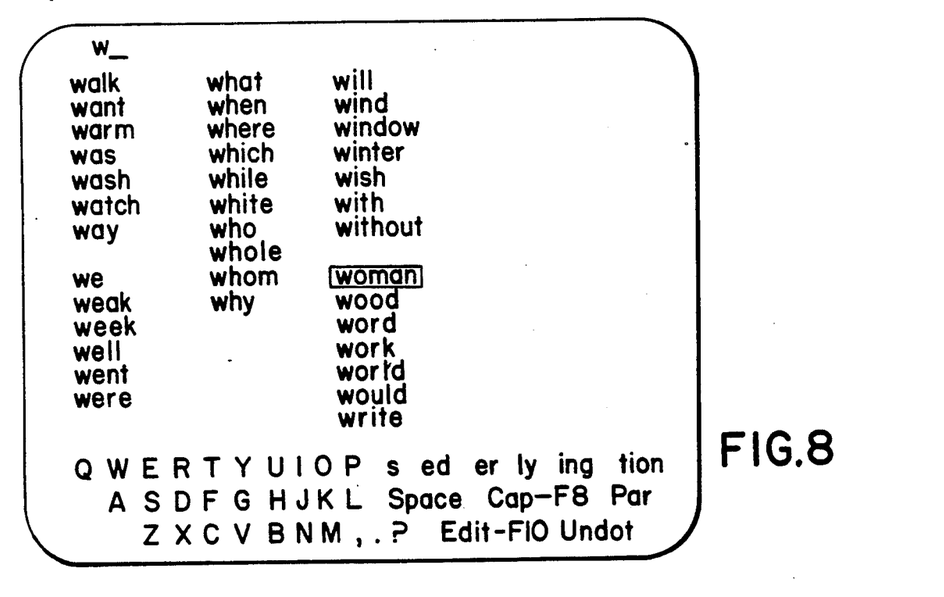

FIGS. 7 and 8 are display screens which illustrate the operation of the Pointwriter system disclosed in the aforementioned patent application Ser. No. 854,430. As shown in FIG. 7, the Pointwriter computer program generates a main image on the display screen which is divided into three separate areas:

(1) The first three rows containing the last three lines of entered text;

(2) The bottom five rows containing the alphabet, arranged as a "QWERTY" keyboard, plus special characters and command words; and (3) The central area consisting of a left part of fifteen rows by twenty-nine columns and a right part of fifteen rows by ten columns. The left part contains seventy of the most commonly used English words. The right part contains the fifteen words that were used most often in the text, but are not among the seventy.

To add a word that is displayed in the central area of this screen to the text displayed in the first three rows, the user simply "points" to the displayed word, using some pointing mechanism such as a mouse-actuated cursor, a light pen, or a touch sensitive display. All the characters to the left and right, including the character pointed to, up to the first space, will be added to the text. A space character will then automatically be added to the text so that the next word added will be separated from this first word by a space. If the word is not one of the seventy common words, it may also be added to the right-hand column of the fifteen most often used words.

If the user wishes to add a word to the text that is not on the main screen of seventy common words or in the column of fifteen most used text words, the user then types the first letter of the word to be entered, e.g., by means of a keyboard or by pointing to that letter on the displayed keyboard at the bottom of the screen. The words in the central area of the screen will then immediately be replaced with words that begin with this letter.

In the example shown in FIG. 8, the letter "w" has been typed, resulting in the display of a large number of commonly used words which begin with "w". If the desired word is still not found among the words in this display, the user enters the next character of the word. Upon entry of this second letter, the words in the central area of the screen are immediately replaced with words that begin with these two letters, and so forth. For example, the user may type "o" so that the display will consist only of words which begin with the letters "wo".

This process continues until the user enters the desired word, either character by character, or by pointing to this word in one of the menus.

Obviously, the speed at which words can be entered into the computer using this Pointwriter system depends, in part, upon the ability of the user to recall (1) if a word to be entered in the text is displayed in a menu at all; and, if so, (2) the particular menu which includes this word, and/or (3) the position of this word within the menu. According to the invention, the user's recollection is repeatedly supported by teaching aids which bring his/her attention to the characters which identify the menu that contains an entered word and/or to the position of this word within the menu.

As indicated above, the characters entered into the text area of the display screen which identify the menu, and/or the characters of a word within a menu, and/or the characters on the displayed keyboard which identify the menu may be displayed with greater brightness than the remaining characters on the screen. Additionally or alternatively, either beep tones or a synthesized voice may be used to indicate the character or characters identifying the menu.

Figure 9A:
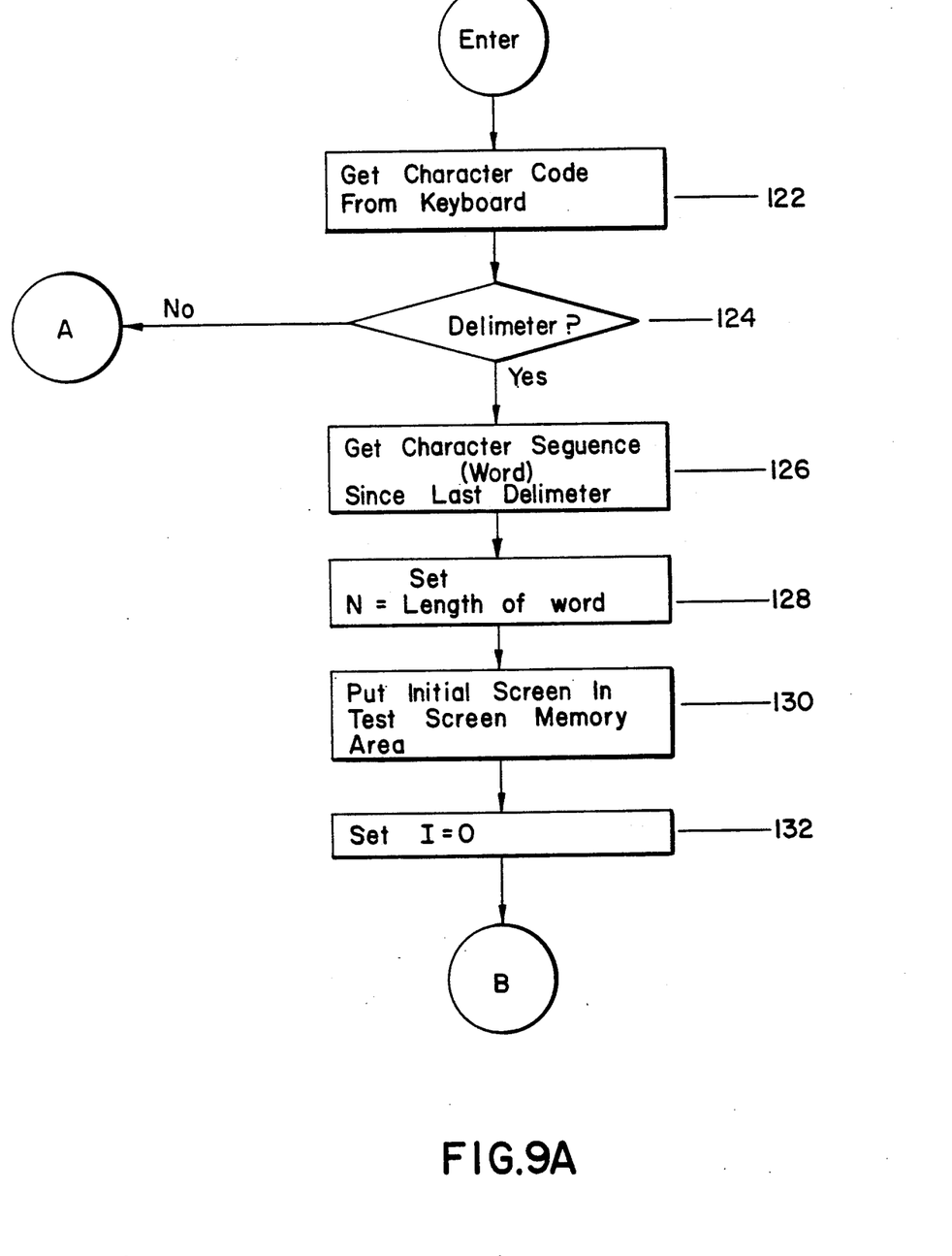
FIGS. 9A, 9B, and 9C, taken together are a flowchart of an algorithm for carrying out the teaching aids in the Pointwriter system.
Figure 9B:
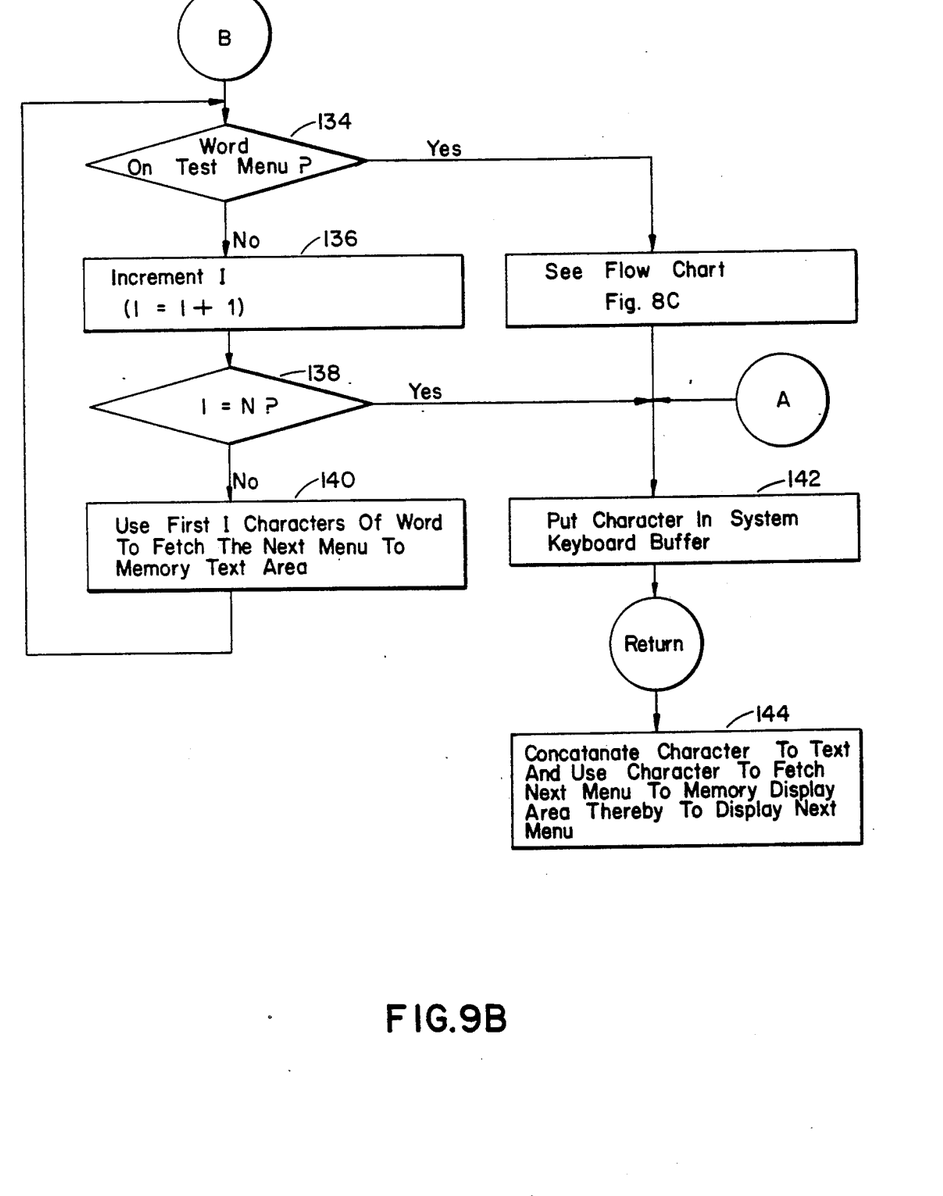
Figure 9C:
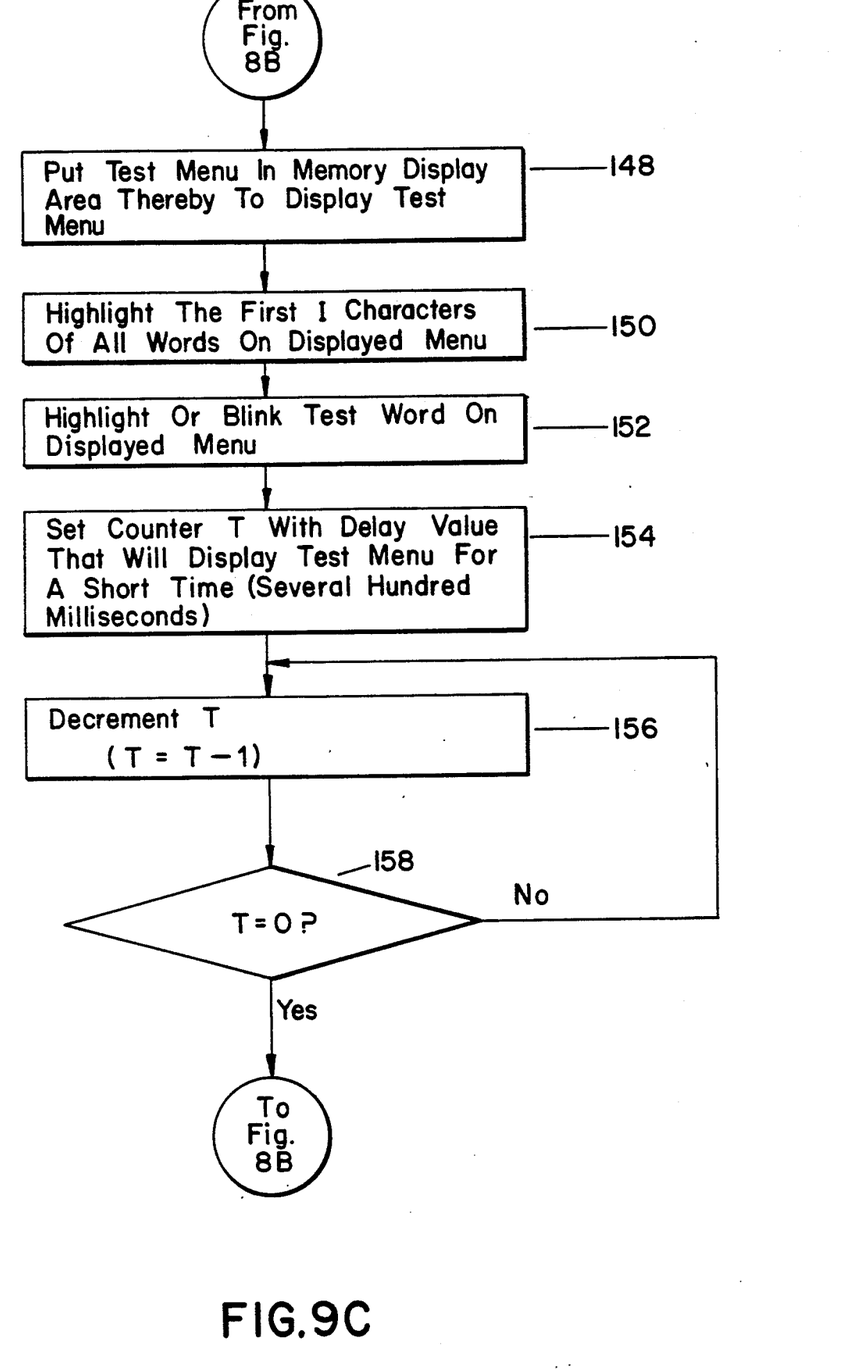

FIGS. 9A, 9B and 9C, taken together, form a flowchart which implements such teaching aids for the Pointwriter system. The algorithm represented in this flowchart is entered each time the computer is interrupted by a keypress or a pointing action. At block 122 the character code for this keypress or pointing action is stored. At block 124 this code is checked to see if it represents a delimiter character. If it does, then at block 126 the last word of text is put in a work area. At block 128 the length of this last word of text is put in a work area. At block 128 the length of this last text word is stored. At block 130 the initial menu (the menu of the most common words, which is displayed after a delimiter keypress is typed) is put in a text area of memory. At block 132, a counter I, which counts the letters of the last text word that have been checked, is initialized to 0. At block 134, the menu in the text area is checked to see if it contains the last text word. If not, then at block 136 the counter I is incremented by one and at block 138 it is checked to see if it is equal to N (i.e., if all the letters of the last text word have been used to fetch menus to the text area).

If not, then at block 140 the first I characters of the last text word are used to fetch the menu corresponding to the first I letters of the last text word. For example, if I=1 and the last word is "word" then the menu corrresponding to "w" is fetched to the text area replacing the initial menu. This menu contains the most common words starting with "w". Then block 134 is entered again to check if the last text word is on this "w" menu (see FIG. 7). If not, then if block 134 is entered again, the "wo" menu will be checked, etc.

If at block 138 I=N, there is no point in finding the last text word on the next menu since the word will have been completely typed, so the algorithm jumps to block 142 where the delimiter character is put in the system keyboard buffer and the algorithm returns control to the application program which will normally concatenate the delimiter character to the last text word and then display the initial menu (block 144).

If at block 124 it is determined that the character code is not for a delimiter character, the algorithm jumps to block 142 where the character is put in the system keyboard buffer. The algorithm next returns control to the application program which will normally concatenate the character to the last text word and then use this character, together with the preceding characters typed after the last delimiter, to fetch the menu corresponding to that character sequence to the memory display area. The user will therefore see the menu and be able to point to the word he/she is trying to type (if it is on the menu).

If at block 134 the last text word is found on the menu in the text area, then at block 148 the menu in the text area is moved to the menu display area so that the user will see it. Then at block 150, the first I characters of all the words on the menu are highlighted so that the user can see the character sequence associated with the menu and know how many characters of the word he/she must type to see the menu displayed. Then at block 152 all the characters of the last text word are highlighted (or blinked) to show the user the position of the word in the menu. Then at block 154, a loop counter is set so that the menu will be displayed for a short time with the said characters highlighted. Finally, when the time elapses (i.e., the loop counter is decremented a sufficient number of times at 156 so that it equals 0 at block 158) the algorithm puts the delimiter character in the keyboard buffer at block 142 and returns the initial menu to the menu display area (at block 144) so that the user can choose his/her text word from the most common words.

There has thus been shown and described a novel method of teaching the use of abbreviations of character sequences entered into a computer which fulfills all the objects and advantages sought therefore. Many changes, modifications, variations and other uses and applications of the subject invention will, however, become apparent to those skilled in the art after considering this specification and the accompanying drawing which discloses the preferred embodiment thereof. All such changes, modifications, variations and other uses and applications which do not depart from the spirit and scope of the invention are deemed to be covered by the invention which is limited only by the claims that follow.

What is claimed is:

1. A method of teaching predetermined shorter sequences of user actions, known as abbreviations, to a computer system user during use of a computer system, said computer system having means for automatically recognizing abbreviations, said abbreviations enabling the computer to manipulate data in a manner corresponding to predetermined longer sequences of user actions, said method of teaching abbreviations to a computer system user while the user is in the act of finishing entering said longer sequences of user actions comprising the steps of:
   (a) permanently storing a plurality of predetermined longer sequences of user actions and corresponding abbreviations in a computer memory;
   (b) reading and temporarily storing sequences of user actions entered by a user during utilization of said computer system;
   (c) automatically comprising said temporarily stored sequence of user actions with said permanently stored plurality of predetermined longer sequences of user actions to determine if an abbreviation for said temporarily stored sequence of user actions exists;

(d) when said comparison step indicates an abbreviation exists, automatically retrieving the stored corresponding abbreviation and automatically indicating to a user said abbreviation;

such that a user learns the abbreviation of a predetermined longer sequence of user actions when said longer sequence of user actions is used during utilization of said computer system.

2. The method defined in claim 1, wherein step (c) includes the step of selecting the abbreviation corresponding to the longest predetermined longer sequence of user actions of at least two possible predetermined longer sequences of user actions if, at any point, the last several data manipulations performed by the computer include at least two sequences of data manipulations each such sequence of data manipulations ending with the very last data manipulation and corresponding to one of said longer sequences of user actions each of which has an abbreviation.

3. The method defined in claim 1, wherein the user actions are keyboard keypresses.

4. The method defined in claim 3, wherein step (c) includes the step of selecting the abbreviation corresponding to the longest predetermined longer sequence of keypresses of at least two possible predetermined longer sequences of keypresses if, at any point, the last part of the text is such that said last part of the text includes text that corresponds to at least two predetermined longer sequences of keypresses each of which has an abbreviation.

5. The method defined in claim 3, wherein step (d) includes the step of displaying the characters of said longer sequence of keypresses in the text that comprise said abbreviation in a different manner than the remaining characters.

6. The method defined in claim 5, wherein said characters that comprise said abbreviation are displayed with greater brightness than said remaining characters.

7. The method defined in claim 3, wherein the characters of said abbreviation which are not part of said longer sequence of keypresses are temporarily displayed in the text.

8. The method defined in claim 3, further comprising the step (e) of imaging on the display a representation of the character keyboard, with the keyboard characters imaged in the same relative positions as they appear on said keyboard.

9. The method defined in claim 8, wherein step (e) includes the step of displaying the character or characters of said abbreviation on said imaged keyboard in a different manner than the remaining characters displayed thereon.

10. The method defined in claim 8, wherein step (e) includes the step of displaying the keys on said imaged keyboard for the character or characters of said abbreviation in a different manner than the remaining keys of said imaged keyboard.

11. The method defined in claim 8, wherein step (d) includes the step of sounding beep tones to indicate, by number and/or pitch, the position of the character or characters of said longer sequence of keypresses which are contained in said abbreviation.

12. The method defined in claim 8, wherein step (d) includes the step of sounding a synthesized voice which pronounces the character or characters of said abbreviation.

13. The method defined in claim 1 wherein the user actions are pointing actions.

14. The method defined in claim 13, wherein step (c) includes the step of selecting the abbreviation corresponding to the longest predetermined longer sequence of pointing actions of at least two possible predetermined longer sequences of pointing actions if, at any point, the last part of the text is such that said last part of the text includes text that corresponds to at least two predetermined longer sequences of pointing actions each of which has an abbreviation.

15. In a computer system having means for entering characters, a display screen and means for identifying locations on the display screen, said computer system being programmed to display information in response to the entry of characters and the identification of locations in accordance with a method comprising the steps of:

(a) displaying on the screen a plurality of lists of linguistic expressions for selection by a user, each list comprising a separate "menu";

(b) selecting successive ones of said linguistic expressions, in response to the identifying means, as these linguistic expressions are chosen by a user by identifying their respective locations on the screen in their respective menus; and (c) displaying on the screen a line of text comprising the identified linguistic expressions in their successive order of selection;

the improvement comprising the method of teaching the user said linguistic expressions and their respective menus, including the steps of:

(1) determining whether a longer sequence of characters entered into the computer is a linguistic expression;

(2) If so, determining the first menu in which said linguistic expression is displayed; and (3) indicating to the user the character or characters which identify said menu.

16. The improvement defined in claim 15, wherein step (a) includes the step of displaying on the screen a first list of linguistic expressions which are the words most likely to be selected by the user.

17. The improvement defined in claim 16, wherein step (a) further includes the step of displaying on the screen a second list of linguistic expressions which begin with the sequence of entered characters.

18. The improvement defined in claim 17, wherein step (3) further includes the step of displaying the characters of said longer sequence that identify said menu in a different manner than the remaining characters of said longer sequence.

19. The improvement defined in claim 18, wherein said characters that identify said menu are displayed with greater brightness than said remaining characters.

20. The improvement defined in claim 15, wherein characters identifying said menu which are not part of said longer sequence are temporarily displayed on the screen.

21. The improvement defined in claim 15, further comprising the step (d) of imaging on said display screen a representation of a character keyboard, with the keyboard characters imaged in the same relative positions as they appear on a standard keyboard.

22. The improvement defined in claim 21, wherein step (3) includes the step of displaying the character or characters identifying said menu on said imaged keyboard in a different manner than the remaining characters displayed thereon.

23. The improvement defined in claim 21, wherein step (3) includes the step of displaying the keys on said imaged keyboard for the character or characters identifying said menu in a different manner than the remaining keys of said imaged keyboard.

24. The improvement defined in claim 15, wherein step (3) includes the step of sounding beep tones to indicate, by number and/or pitch, the position of the character or characters of said longer sequence which identify said menu.

25. The improvement defined in claim 15, wherein step (3) includes the step of sounding a synthesized voice which pronounces the character or characters identifying said menu.

26. The improvement defined in claim 15, further comprising the steps of (4) displaying said menu containing said linguistic expression and (5) bringing the user's attention to the position of said linguistic expression on said menu.

27. The improvement defined in claim 26, wherein step (5) includes the step of displaying at least some characters of said linguistic expression within said menu in a different manner than the remaining characters in said menu.

28. The improvement defined in claim 27, wherein said characters displayed in a different manner are displayed with greater brightness than said remaining characters.